United States Patent [19]
Malladi et al.

[11] Patent Number: 5,815,206
[45] Date of Patent: Sep. 29, 1998

[54] METHOD FOR PARTITIONING HARDWARE AND FIRMWARE TASKS IN DIGITAL AUDIO/VIDEO DECODING

[75] Inventors: Srinivasa R. Malladi, San Jose; Marc A. Miller, Palo Alto; Kwok K. Chau, Los Altos, all of Calif.

[73] Assignee: LSI Logic Corporation, Milpitas, Calif.

[21] Appl. No.: 643,185

[22] Filed: May 3, 1996

[51] Int. Cl.⁶ .............................. H04N 7/36; H04N 7/50
[52] U.S. Cl. ..................... 348/390; 348/423; 348/845; 381/2; 704/504
[58] Field of Search ................... 348/423, 845, 348/390; 381/2; 704/504; H04N 7/36, 7/50

[56] References Cited

U.S. PATENT DOCUMENTS

| | | | |
|---|---|---|---|
| 5,394,473 | 2/1995 | Davidson | 704/211 |
| 5,506,832 | 4/1996 | Arshi | 348/15 |
| 5,598,352 | 1/1997 | Rosenau | 348/423 |

OTHER PUBLICATIONS

Martin Boliek, "*Real–Time Discrete Cosine Transform Chip Using Generalized Chen Transforms Technology,*" pp. 428–431, Ricoh California Research Center, Menlo Park, CA.

Unknown, "*Digital Audio Compression (AC–3),*" T3 review copy of draft ATSC audio standard, Aug. 12, 1994, Doc. T3/251.

Unknown, "*Information Technology–Generic Coding of Moving Pictures and Associated Audio Information: Video,*" ISO/IEC 13818–2, Draft International Standard, Nov. 9, 1994.

Unknown, "*Coding of Moving Pictures and Associated Audio,*" ISO/IEC 13818–3, International Standard, Nov. 11, 1994.

Dave Bursky, "*Single Chip Performs Both Audio and Video Decoding,*" Electronic Design, Apr. 3, 1995.

Unknown, "*Coding of Moving Pictures and Associated Audio for Digital Storage Media At Up To About 1.5 MBIT/s,*" 3–11171 rev. 1, (Part 3 Audio), May 30, 1995.

Primary Examiner—Howard Britton
Attorney, Agent, or Firm—Hickman & Martine, LLP

[57] ABSTRACT

Disclosed is a partitioning procedure for designing MPEG decoders, AC-3 decoders, and decoders for other audio/video standards. The procedure provides that some specified decoding functionality be implemented exclusively in the form of hardware and certain other specified decoding functionality be provided exclusively as firmware or software. A video decoder designed according to this procedure includes the following elements: (a) firmware or software for implementing, in conjunction with a CPU, video header processing functions; and (b) hardware for implementing preparsing assist, macroblock reconstruction, and video display control functions. An audio decoder designed according to this procedure includes the following elements: (a) firmware or software for implementing, in conjunction with a CPU, decoding fields containing parameters for processing the audio data; and (b) hardware for implementing matrixing and windowing functions on the audio data.

24 Claims, 6 Drawing Sheets

METHOD FOR PARTITIONING HARDWARE AND FIRMWARE TASKS IN DIGITAL AUDIO/VIDEO DECODING

CROSS REFERENCE TO RELATED APPLICATIONS

This application is related to the following U.S. patent applications: (1) U.S. patent application Ser. No. 08/642,396 filed on the same day as the instant application, and naming Srinivasa R. Malladi and Venkat Mattela as inventors, and entitled "Microarchitecture of Video Core for MPEG-2 Decoder," (2) to U.S. patent application Ser. No. 08/642,520 filed on the same day as the instant application, and naming Srinivasa R. Malladi and Mahadev S. Kolluru as inventors, and entitled "Microarchitecture for Audio Core for an MPEG-2 and AC-3 Decoder," and (3) U.S. patent application Ser. No. 08/642,393 filed on the same day as the instant application, and naming Srinivasa R. Malladi as inventor, and entitled "Method and Apparatus for Designing Re-useable Core Interface Shells." All three applications are incorporated herein by reference in their entireties and for all purposes.

BACKGROUND OF THE INVENTION

The present invention relates to systems for decoding coded video and audio information. More specifically, the invention relates to partitioning decoding tasks between hardware and software/firmware in order to increase decoding efficiency and performance.

Various standards have been developed for the purpose of providing digitally encoded video and audio data that can be reconstructed to provide good quality playback. In the late 1980s, a digital audio/video reconstruction standard known as "MPEG" (for Motion Pictures Experts Group) was promulgated by the International Standards Organization (ISO). MPEG syntax provides an efficient way to represent audio and video sequences in the form of compact coded data. MPEG unambiguously defines the form of a compressed bit stream generated for digital audio/video data. Given knowledge of the MPEG rules, one can thus create a decoder which reconstructs an audio/video sequence from the compressed bit stream.

The MPEG-2 video standard is described in a document entitled "Generic Coding of Moving Pictures and Associated Audio Information: Video," ISO/IEC 13818-2 (hereinafter "the MPEG/Video Document"), and is hereby incorporated by reference for all purposes. The MPEG audio standards are described in: (1) the MPEG-1 audio document entitled "Coding of Moving Pictures and Associated Audio for Digital Storage Media at up to about 1.5 MBit/s" (Part 3 Audio) 3-11171 rev 1 (1995); and (2) the MPEG-2 audio document entitled "Generic Coding of Moving Pictures and Associated Audio Information" ISO/IEC 13818-3, (hereinafter "the MPEG/Audio Documents"). Both MPEG audio standards documents are hereby incorporated by reference for all purposes. All above-referenced MPEG standards documents may be obtained form ISO/IEC Case Postale 56, CH- 1211, Geneva 20, Switzerland.

A competing audio standard employing Dolby® processing and known as "AC-3" has also been developed by the United States Advanced Television Systems Committee for digital encoding and decoding of audio data. This standard is described in the "Digital Audio Compression (AC-3)" draft ATSC STANDARD" AC3STD68.DOC (1994) (hereinafter "the AC-3 Document") which is available from Dolby Laboratories, Inc. located in San Francisco, Calif. and is hereby incorporated by reference for all purposes.

As can be appreciated, digital video and audio data for high quality playback requires quite significant computational resources. MPEG-2 video decoding, for example, requires a processor capable of decoding 720 by 480 (NTSC) pixel frames for display at 30 Hz, and 720 by 576 (PAL) pixel frames for display at 25 Hz. Each frame includes color and intensity pixel data that is encoded according to a two-dimensional discrete cosine transform, quantization, variable length encoding, half pel averaging, etc. An MPEG-2 video decoder must therefore reverse each of these encoding functions fast enough for display at 30 Hz. The decoder will also be called upon to concurrently decode audio data via an inverse discrete cosine transform (in the case of MPEG) or an inverse fast fourier transform (in the case of AC-3) and other techniques.

In view of these requirements, audio/video decoders must be carefully designed to ensure sufficient speed and bandwidth. On the one hand, the decoder can be implemented as software or firmware. In this case, a generic CPU supplies all computational power for decoding. Unfortunately, most general purpose CPUs available today, simply cannot perform the decoding tasks. Even if they could (and they may be able to in the near future), they would have to be dedicated to the decoding process and would therefore be unavailable for processing other CPU related tasks not directly related to the decoding process. Even the highest performance CPUs will, for the foreseeable future, be unable to handle all decoding tasks without experiencing serious processing interruptions.

On the other hand, audio and video decoding tasks may be entirely implemented as hardware. However, all the hardware dedicated to performing the numerous decoding tasks requires substantial space on an integrated circuit (IC) chip. As more functions are implemented as hardware, there is less room on the chip available for other functions and the overall cost of the chip goes up. Therefore, hardware only decoders do not necessarily make efficiently use of silicon.

Further, designing new decoder hardware for decoding is a quite expensive process. The design is first provided as a Boolean description in a hardware design language such as Verilog available from Cadence Design Systems, Inc. of Santa Clara, Calif. Then the code for the processor design model is used to create a net list, which is, in turn, used to create a physical layout for the integrated circuit. The physical layout must then be converted to reticles (or masks) for fabricating the ultimate silicon version of the integrated circuit. At each stage in the process, from a hardware design language description through silicon hardware, the integrated circuit must be extensively tested for bugs and to improve performance. To the extent that generic hardware such as CPUs can be employed, the decoder design might be significantly streamlined.

In view of the above, various tradeoffs must be considered in designing a decoder as software, hardware, or some combination of the two. Thus, it would be desirable to have a procedure for intelligently partitioning decoding tasks between software and hardware.

SUMMARY OF THE INVENTION

The present invention provides such intelligent partitioning procedure for designing MPEG decoders, AC-3 decoders, and decoders for other audio/video standards. The invention provides that some specified decoding functionality be implemented exclusively in the form of hardware and certain other specified decoding functionality be provided exclusively as firmware or software. Still other decoding functionality might be provided as either hardware or firmware, depending upon the requirements of the designer and based on system implementation issues. Whether to provide the decoding functionality as exclusively hardware, exclusively firmware, or either hardware or firmware is based upon criteria such as (1) the computational intensity of the decoding functionality, (2) the flexibility that the associated standard (e.g., MPEG or AC-3) allows in implementing the functionality, (3) the amount of CPU interruptions that would be required to implement the functionality as firmware and (4) the size constraints of hardware.

Those functions that are most computationally intensive are implemented as hardware. Also, those functions that would cause frequent CPU interrupts are preferably implemented as hardware. Such hardware is designed to perform its intended function more efficiently than a general purpose CPU. This allows the system CPU to execute "system" tasks without devoting processing resources to the functions implemented on the hardware.

The hardware may be either a "core" or custom designed hardware. A core design specifies the transistor-by-transistor layout and associated signal interfaces of a particular hardware block. Thus, a significant advantage of core-based designing derives from the core's availability for repeated use in many different chip designs for different applications. In each such chip design, the decoding functions specified by the core can be employed without redesign. Thus, the core may be used on a first integrated circuit having a first integrated circuit design and on a second integrated circuit having a second integrated circuit design, with the first and second integrated circuit designs having at least some features not in common. If a "system chip" having multiple cores is employed, the first integrated circuit design may include a first collection of cores, while the second integrated circuit may include a second collection of cores, etc.—even though the first and second collections of cores have at least one core not in common.

Cores are obviously most appropriate for implementing those standard decoding functions that are rather rigid (i.e., those functions that a standard indicates must be implemented in a rather specific manner). Often these rigidly defined functions are also computationally intensive, so a hardware core implementation is the logical choice.

For flexibly defined functions of a decoding standard, a designer is free to design hardware or software blocks, optimized for the designer's purposes, to perform those functions. Note that if a decoding task is rigidly established by standard, a designer will generally have no interest in customizing those tasks, and a core provides the best result. On the other hand, decoding tasks that are less rigidly defined by standard may be implemented as customized hardware or software to serve the designer's specific needs.

As noted, firmware implements some functions of a decoding standard. Such functions are typically those that are not particularly computationally intensive and/or those that may be performed by CPU polling as opposed to CPU interrupts.

In one aspect, the present invention provides a video decoder for decoding video data contained in a bitstream. Such video decoder may be characterized as including the following elements: (a) firmware or software for implementing, in conjunction with a CPU, video header processing functions; and (b) hardware for implementing preparsing assist, macroblock reconstruction, and video display control functions.

In preferred embodiments, the video header processing functions implemented by the firmware include programming hardware control registers with control information obtained from processing one or more video headers (e.g., MPEG video headers including sequence headers, group of picture headers, picture headers, slice headers, sequence extensions, and picture extensions). In further preferred embodiments, the hardware includes a video core for implementing at least the following operations: inverse scan, inverse quantization, IDCT, half pel averaging, and merge functions. In this embodiment, the hardware may also include macroblock processing logic for implementing macroblock header processing, motion vector decoding, variable length decoding, and run length decoding.

Preferably, the firmware also implements audio and video synchronization, and preparsing functions. Examples of audio and video synchronization functions include determining a starting point for decoding, video display control register programming, and audio playback control register programming. Examples of preparsing functions include extraction of time stamp information from the bitstream, issuing commands to demultiplex the bitstream to at least a channel video memory and a channel audio memory, and programming direct memory access to transfer the bitstream from a stream buffer to at least the channel video memory or the channel audio memory.

Preferably the hardware also implements preparsing assist functions and video display control functions. Examples of the preparsing assist functions implemented as hardware include byte alignment and start code detection, writing to a start code table, and buffer management for the bitstream. The above video processing functions are described in the MPEG video document previously incorporated by reference.

In another aspect, the present invention provides an audio decoder for decoding audio data contained in a bitstream. This audio decoder may be characterized as including the following elements: (a) firmware or software for implementing, in conjunction with a CPU, decoding fields containing parameters for processing the audio data; and (b) hardware for implementing sub-band synthesis and windowing functions on the audio data. Preferably, the audio decoder hardware includes an audio core having a data path, a ROM, an input RAM interface, and an output RAM interface.

The firmware or software may also implement one or more of the following functions: (1) loading audio samples contained in the audio data to a storage region before the audio samples are processed by the hardware, (2) providing control information from the bitstream to one or more control registers in the hardware, (3) requantizing the audio samples, (4) processing headers contained in the audio data, and (5) error checking. Preferably, it can process both MPEG data and AC-3 data. In the case of MPEG data, the firmware may decode bit allocation parameters, decode scale factors, and perform variable length decoding of samples, for example. In the case of AC-3 data, the firmware may perform bit allocation, decode exponents, perform decoupling, perform rematrixing, and perform dynamic range compression. The above audio processing functions are described in the AC-3 and MPEG audio documents previously incorporated by reference.

These and other features and advantages of the invention will be described in more detail below with reference to the drawings.

DETAILED DESCRIPTION OF THE PREFERRED EMBODIMENTS

A. General Items

Figure 1A:
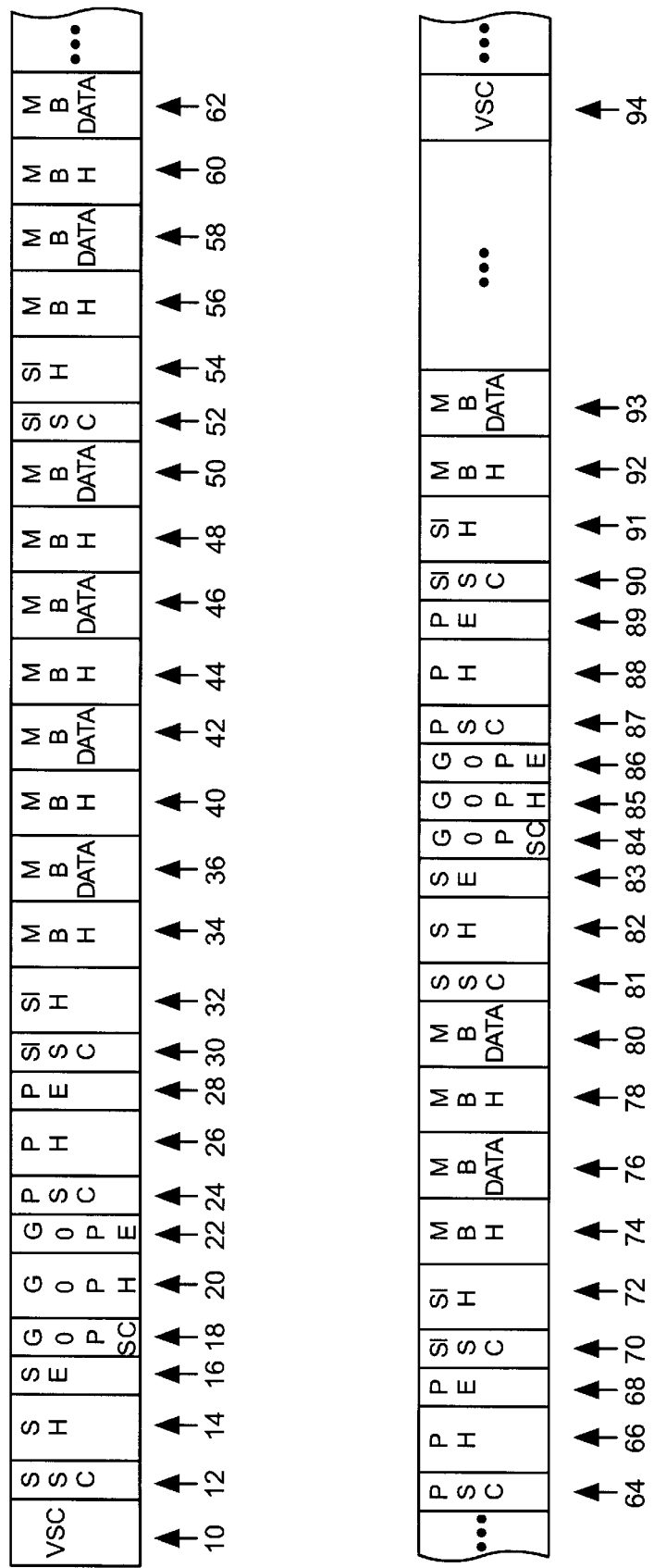
FIG. 1A is a diagram of bit stream containing video data encoded according to the MPEG-2 standard.

The following discussion and associated figures provide one preferred implementation of the partitioning procedure of the present invention. This procedure is employed to design a decoder which can decode MPEG-2 audio and video data as well as AC-3 audio data. Hereinafter, except where distinctions between the two versions of the MPEG standard exist, the terms "MPEG" and "MPEG-2" will be used interchangeably to reference those video decoding algorithms promulgated in the original MPEG-1 Document as well as in the MPEG-2 Document, and any future versions of MPEG decoding. Further, the term AC-3 is intended to cover current, past, and future versions of that audio decoding standard.

As noted, some hardware decoding tasks will be performed on hardware "cores." As used herein, a core is the hardware layout of a substantially self-contained integrated circuit module such as a CPU, an Asynchronous Transfer Mode (ATM) unit, a memory unit, a network interface, an audio decoder, and a video decoder. The physical core has associated therewith a core design which specifies a collection of mask layouts used to generate the reticles for photolithography steps employed during integrated circuit fabrication. The core design also includes certain processing parameters associated with masks, such as ion implant energy and dose, etch conditions, oxidation conditions, chemical vapor deposition conditions, etc. Still further, the core design includes information specifying the core interface parameters such as the types of input and output signals required, the locations of the various interface connections, etc.

As noted, hardware cores are most useful for functions that are rigidly defined by standard. Customized hardware may be employed for other computationally intensive and/or highly repetitive functions that are not so rigidly defined by standard.

Less repetitive and computationally inexpensive tasks may be implemented as software or more preferably firmware. If software is employed, it should be provided with an efficient compiler and preferably as assembly language. Of course, it remains within the scope of this invention to implement some functions in higher level languages such as Fortran, Pascal, C++, C, etc. Throughout the remainder of the specification, references to "firmware" or "software" are intended to cover both possibilities.

In one preferred embodiment, the entire software and hardware decoder along with other system functions are provided on a single "system on a chip." System on a chip designs typically include multiple cores integrated on single semiconductor chip that might include a microprocessor core, a video decoder core, and an audio decoder core: all taken from library of core designs. A system designer is left with the task of integrating the various cores on a single chip and providing any processing functionality not specified in the core designs. A part of this invention defines what functionality must be defined as cores and what functionality should be defined by the designer. This allows the designer to customize some parts of the system chip and thereby differentiate its product from that of other designers. For a more detailed discussion on video and audio cores and core microarchitectures, reference may be made to related U.S. patent application Ser. No. 08/642,396 and U.S. patent application Ser. No. 08/642,520 both of which were previously incorporated herein by reference.

A designs and partitioning associated with this invention may take several forms. For example, the design for the hardware itself is preferably stored on a machine readable media such as a magnetic or optical storage unit. The information content of the design preferably includes a series of hardware layouts specifying the locations and features of various circuit elements comprising the hardware architecture. Ultimately, the design is implemented as hardware on one or more chips. Thus, the design exists as both an intangible description of hardware and as the actual hardware itself. In general, chips and their designs that partition decoder functions in the manner described herein fall within the scope of this invention.

The following flow diagrams illustrate how various functions of MPEG and AC-3 standards are implemented are partitioned in accordance with one preferred embodiment of the present invention.

B. Partitioning Video Decoding Tasks

As the present invention preferably implements portions of the MPEG video decoding algorithm, the general MPEG video decoding algorithm will now be described with reference to FIGS. 1A, 1B, and 1C. For purposes of the following discussion, it will be assumed that the reader has available a copy of the MPEG-2/Video Document, previously incorporated herein by reference.

Compressed data such as video data is generally transmitted as a bit streams of "ones" and "zeros" representing coded data. In MPEG, bit streams are typically divided into packets of data, and each packet is configured to have a start code indicative of either video, audio or synchronization data. By way of example, a video packet may begin with twenty three consecutive zeros "0," a one "1", followed by a "1," and then followed by an identifying "byte" (i.e., a total of 32 bits) which may designate the current packet as either video, audio or synchronization data.

The following is a brief description of the architectural hierarchy associated with a packetized video bit stream as described in the MPEG/Video Document. While this description presents the example of an NTSC video standard (employing a resolution of 720 by 480 pixels), the invention also covers other standards such as the PAL video standard (employing a resolution of 720 by 576 pixels).

When a decoder receives a bit stream, it receives a packetized elementary stream (PES) header and an associated video payload. The video payload begins with a video start code. From there, the outer most level of the hierarchy begins at a "sequence" level, which includes one or more coded frames that have some pixel data commonality. By way of example, pixel data commonality between frames may be represented as an identical blue sky background associated with filming an air show.

The next level in the video bit stream hierarchy is a "group of pictures" (GOP) level. The GOP level typically includes a group of about 4 to 5 frames (an amount sufficient to allow humans to perceive a change in image) also having some pixel data commonality. Following the GOP level is a "picture" level. As noted, a picture in MPEG-2 is defined as a frame having a grid of 720-by-480 pixels (or 720 by-240 pixels for a field). At a level below the picture level is a "slice" level. A slice level is defined as series of one or more groups of 16-by-16 pixels that are aligned in horizontal rows about a frame. In general, slices are used to identify specific regions of pixel data that are common between successive frames pictures. As described in FIG. 6–8 of the MPEG/Video Document, a picture may be carved into several slices. Below the slice level is a "macroblock" level which identifies a square block of 16-by-16 pixels. Thus, a single 720-by-480 MPEG-2 frame includes 1350 macroblocks arranged as 45 to a row over 30 rows. For a 4:2:0 chrominance structure, each macroblock includes four 8-by-8 pixel "luminance" blocks, and two 8-by-8 "chrominance" blocks (denoted chroma red and chroma blue).

Figure 1B:
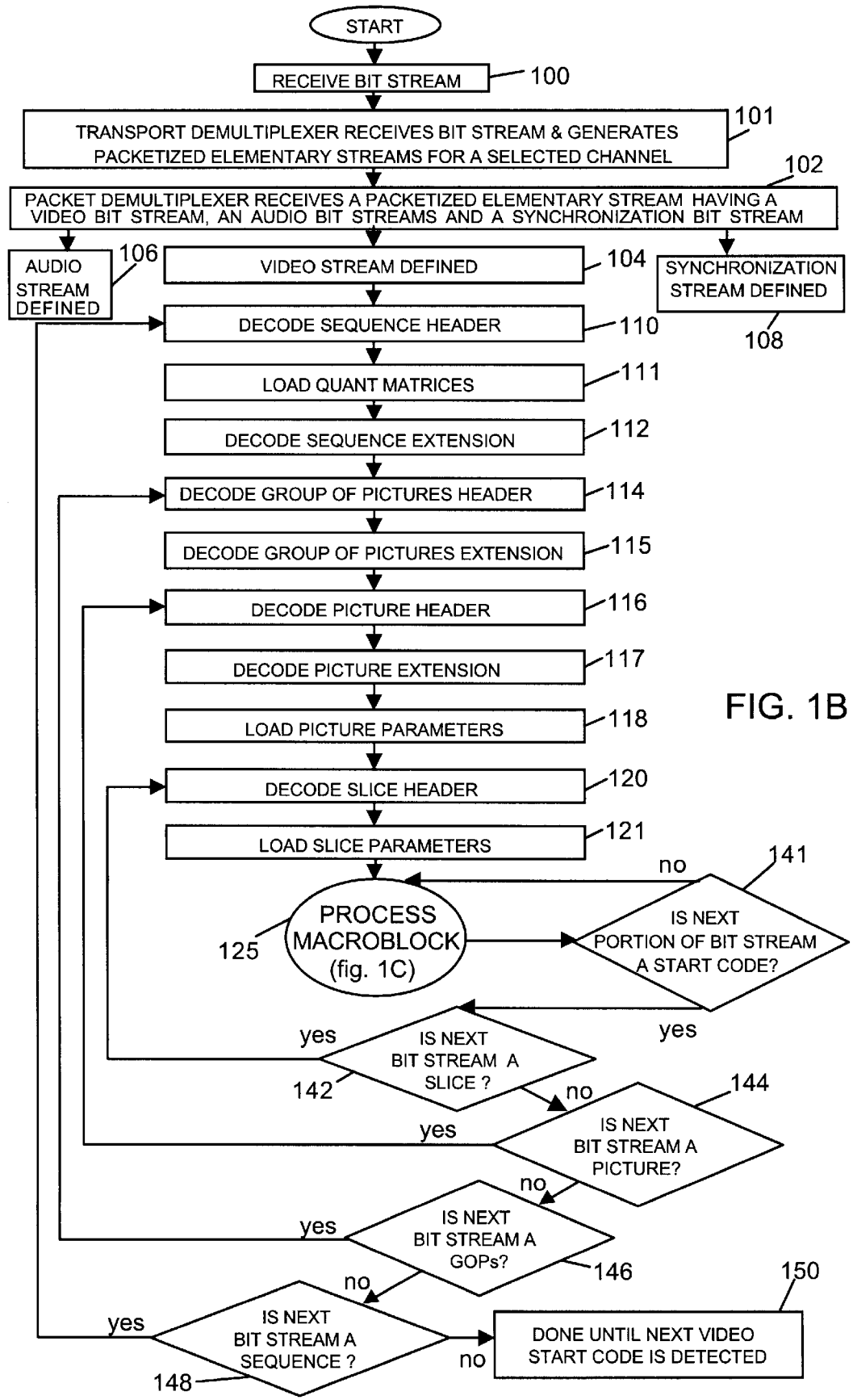
FIG. 1B is a process flow diagram of the video decoding steps performed in firmware in accordance with a preferred embodiment of this invention.
Figure 1C:
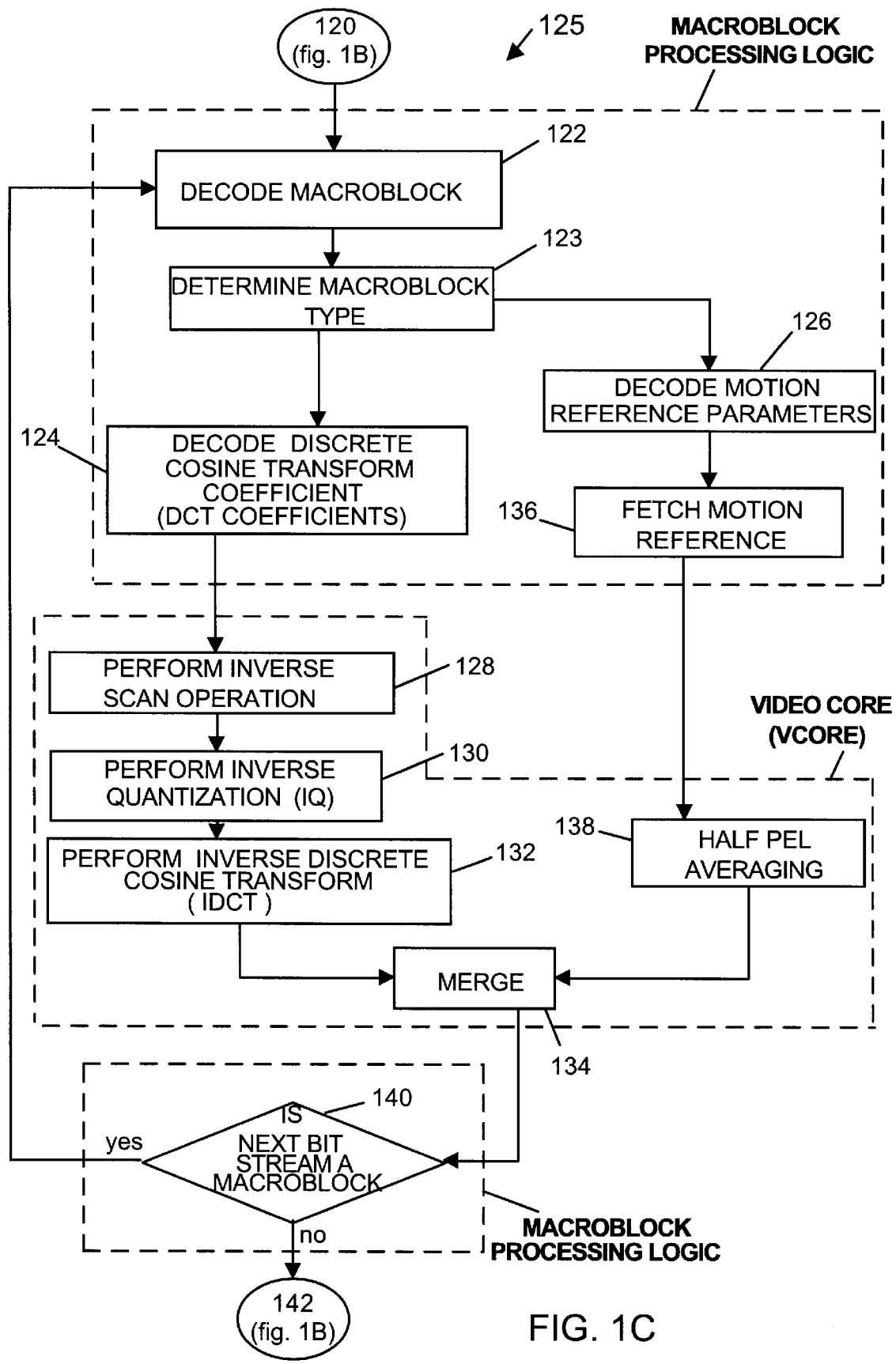
FIG. 1C is a process flow diagram detailing the video decoding steps performed in hardware in accordance with a preferred embodiment of this invention.

FIGS. 1A through 1C illustrate the method by which an MPEG-2 decoder receives a compressed digital bit stream and decompresses that bit stream using a combination of firmware, and hardware cores in order to increase decoding efficiency. FIG. 1A shows an exemplary MPEG-2 video bit stream that must be decoded, and FIGS. 1B and 1C present the method steps employed in decoding the video bit stream data. In a preferred embodiment, video decoding steps of FIG. 1B are performed exclusively by firmware, while the steps described in FIG. 1C are performed exclusively by hardware, including at least one core.

The steps of FIG. 1B begin at a step 100 where a digital bit stream is received. The method then proceeds to a step 101 where a transport demultiplexer receives the bit stream. The transport demultiplexer functions as a selection mechanism which allows the identification and selection of a particular channel. The channel selection process is necessitated since the bit stream received at step 100 may include bit stream data for a number of different channels, each of which may contain independent content. Once a particular channel is selected, the transport demultiplexer routes a packetized elementary stream (PES) for the selected channel. Consequently, the bit stream data information associated with unselected channels is simply disregarded during the decoding process.

The method then proceeds to a step 102 where a packet demultiplexer receives the PES generated at step 101. The packet demultiplexer is generally designed to identify and sort the PES into audio packets, video packets, or synchronization (i.e., time stamp) packets. Once sorted, the audio data will be diverted through an audio bit stream path 106, the video data will be diverted through a video bit stream path 104 and the synchronization data will be diverted through a synchronization bit stream path 108.

For illustration purposes, a hypothetical packetized video bit stream is shown in FIG. 1A. The video bit stream begins with a video start code (VSC) 10. Following VSC 10 is a sequence start code 12 indicating the beginning of a new sequence. Sequence start code 12 is then followed by a sequence header 14. As is well known in the art, headers provide decoders with additional identifying characteristics about particular video data pertaining to the sequence (or other video unit) associated with the header.

Returning now to FIG. 1B, the method continues from step 104 to a step 110 where sequence header 14 is decoded. As described in the MPEG/Video Document, a sequence header may contain a variety of identifying information such as horizontal picture size, vertical picture size, frame rate code, the bit rate code, quantization matrix information, etc. Once sequence header 14 is decoded, the method will proceed to a step 111 where a quantization matrix identified in sequence header 14 is loaded into a predefined memory location on a video core (VCORE). For detailed discussion of the video core's microarchitecture, reference may be made to a related pending U.S. patent application Ser. No. 08/642,396 and previously incorporated by reference.

Next in the method, a sequence extension 16 is decoded at a step 112. As shown in FIG. 1A, the sequence header is followed by a sequence extension 16. As described in the MPEG/Video Document, extensions are optional, but when employed provide additional identifying information beyond that provided by a header.

Sequentially following sequence extension 16 in the FIG. 1A bit steam are a group of pictures (GOP) start code 18, a GOP header 20 and a GOP extension 22 (optional). To handle these items, the method of FIG. 1B proceeds to a step 114 where GOP header 18 is decoded as described in the MPEG/Video Document. From step 114, the method proceeds to a step 115 where GOP extension 22 is decoded. Sequentially following the GOP extension 22 of FIG. 1A are a picture start code 24, a picture header 26 and a picture extension 28. The method of FIG. 1B handles these items by first proceeding to a step 116 where picture header 26 is decoded. Once the picture header is decoded, the method proceeds to a step 117 where picture parameters identified in the decoded picture header 26 are loaded onto predefined memory registers in the video core. Thereafter, the method proceeds to a step 118 where picture extension 28 is decoded.

Following picture extension 28 (of FIG. 1A), is a slice start code 30, and a slice header 32. The method of FIG. 1B therefore proceeds to a step 120 where slice header 32 is decoded. After decoding slice header 32, the method proceeds to a step 121 where slice parameters identified in the decoded slice header 32 are loaded onto predefined memory registers in the video core. As shown in FIG. 1A, slice header 32 is followed by a macroblock header 34 and macroblock data 36. As used herein, "macroblock data" 36 signifies the actual luminance and chrominance data associated with the currently processed macroblock.

As shown in FIG. 1B, the macroblock data is processed at a step 125. This step is detailed in FIG. 1C. As shown there, each macroblock processing step is implemented in one of two separate hardware regions. The first hardware region is a "macroblock processing logic," and the second hardware region is the video core. While the steps identified as being implemented in the macroblock processing logic are preferably implemented in a single hardware core, there is in principle no reason why they could not be implemented custom-made hardware, or divided between various hardware cores, etc.

Before the turning to the details of the macroblock processing logic, it should be understood that one type of MPEG-2 macroblock may be defined as being a "4:2:0" chrominance structure which means that the macroblock includes 6 blocks, four of which contain luminance data and two of which contain chrominance data. Each such block includes an 8-by-8 matrix of pixel data values. The four blocks of luminance data each populate one corner of the 16-by-16 macroblock. Thus, there is a one-to-one correspondence between macroblock pixels and luminance block pixels. For each chrominance block, however, there is not a one-to-one correspondence with the macroblock pixels. In fact, chrominance data is provided at a lower resolution than luminance data. Specifically, the 64 (8-by-8) chrominance values in each chrominance block are spread over the entire region subsumed by the 256 (16-by-16) macroblock pixels.

Now, macroblock data is provided in the bit stream, one block at a time. According to the MPEG/Video Document, the four luminance blocks are decoded first, in sequence, before the two chrominance blocks are decoded, in sequence. Each block to be decoded is provided as compressed data which must be decoded as follows.

While initially in the macroblock processing logic (FIG. 1C), the method proceeds to a step 122 where the current macroblock header 34 is decoded. Once macroblock header 34 is decoded, the method proceeds to a step 123 where it is determined whether the current macroblock is "intra coded" or "non-intra coded." This determination is made by referring to the picture level header and macroblock header. Briefly, an intra coded macroblock must be reconstructed from scratch, without reference to other macroblocks. This is, of course, computationally intensive. A non-intra coded macroblock, in contrast, may be reconstructed by using reconstructed data from previous (or previous and future) reference frames, thus providing substantial computational savings.

If the macroblock is intra coded, then each block comprising that macroblock must be treated according to the MPEG-2 algorithm for intra coded blocks. If, however, the macroblock is determined to be non-intra coded, then each block must be treated according to the MPEG-2 algorithm for non-intra coded blocks. In addition, some block in the non-intra coded macroblock may also have to be treated according the algorithm for intra coded blocks in order to correct for certain "errors." Which blocks within a non-intra coded macroblock must also be treated by the intra coded algorithm is determined by an MPEG-2 parameter known as the coded_block_pattern (CBP). The CBP identifies which specific blocks in the current macroblock must be treated by both the intra and non-intra coded algorithms. This parameter is loaded into the video core when the macroblock header is decoded.

If it is determined at step 123 that the current macroblock is intra coded (or the CBP determines that a current block should be treated by the intra coded algorithm), the method will then proceed down an intra coded path (steps 124, 128, 130, and 132). On the other hand, if it is determined that the current macroblock is non-intra coded, then a motion compensation process must be performed (steps 126, 136 and 138).

Focusing first on the intra coded pathway, a step 124 initially decodes the incoming bit stream to produce discrete cosine transform (DCT) coefficients. This involves one or more MPEG-2 steps such as variable length decoding. The result is an output of partially decoded DCT coefficients (64 per block) each of 12 bit width. These values are passed from the macroblock processing logic to the video core hardware where a step 128 performs an inverse scan operation to correlate each incoming encoded DCT coefficient with a particular location in an 8-by-8 matrix as described in section 7.3 of the MPEG/Video Document.

Once the inverse scan operation is performed, the method proceeds to a step 130 where an inverse quantization step is performed. An inverse quantization step generally involves multiplying each DCT coefficient by the appropriate weighting factor from locations in one of two weighting matrices. In general, one weighting matrix is used for intra coded macroblocks and another is used for non-intra coded macroblocks. Once the inverse quantization step is complete, the method proceeds to a step 132 where an inverse discrete cosine transform ("IDCT") is performed. As described in section 7.5 of the MPEG/Video Document, the IDCT operation is performed to convert the block data from frequency space to Cartesian space.

Turning now to the non-intra coded pathway (steps 126, 136, and 138), block data is processed according a "motion compensation" algorithm. As described in the MPEG/Video Document, a macroblock that is non-intra coded may require motion compensation for those blocks that reference past and/or future frame information. By way of example, a non-intra coded block may rely on information from frames in the past. This is called a predictive "P" motion compensation. In addition, a non-intra coded block may also rely on information from both past and future frames. This is called a bi-directional "B" motion compensation.

A block from a non-intra coded macroblock is initially processed at a step 126 where the motion reference parameters such as a motion vector pointing to a location in a past or future macroblock are decoded. Once the motion reference parameters are decoded, the method proceeds to a step 136 where a motion reference (reconstructed block data from a past or future frame) is fetched from the intra coded frame information stored in a temporary storage queue.

As shown, steps 126 and 136 are performed in the macroblock processing logic. The resulting processed macroblock information passes to the video core hardware microarchitecture. At this point, a half-pel averaging step is performed at a step 138. Half-pel averaging is described in section 7.7 of the MPEG/Video Document. Once the half pel averaging is complete at step 138 and the IDCT step is complete at step 132, the method proceeds to a step 134 where a merge operation is performed. The merge operation only really applies in the case where a non-intra coded block is processed with an "error" handled by the intra coded pathway. In such cases, the merge operation combines the macroblock information passing through the intra coded path and the macroblock information passing through the motion compensation path.

As can be appreciated, the steps performed in the video core hardware are extremely repetitive and computationally intensive (e.g., numerous matrix multiplications for each macroblock). Consequently, if these steps had been performed in firmware, the bandwidth demands on the CPU would exceed its bandwidth capacity, resulting in numerous CPU interrupts. In this embodiment, CPU interrupts are avoided by dedicating the video core hardware for these tasks that are rigidly defined by the MPEG/Video Document.

By this point, macroblock header 34 and macroblock data 36 (of FIG. 1A) have now been processed through the steps embodied in the video core of FIG. 1C. After the merge operation of step 134 is complete, the method then determines, in a step 140, whether the next portion of the bit stream defines another macroblock. In the exemplary bit stream provided in FIG. 1A, the next portion of the bit stream contains a macroblock header 40. Consequently, the method will again march through the macroblock processing logic and video core as described above. Specifically, the method will march through the hardware steps for the next two sets of macroblock headers 44, 48 and macroblock data 46, 50 of FIG. 1A.

The method then continues to process the macroblocks through the macroblock processing logic and video core of FIG. 1C until the next portion of the bit stream no longer provides macroblock data. This event is noted in the bit stream by a start code for the next slice, picture, etc. Thus, as macroblocks are processed as shown in FIG. 1C, the system is constantly checking for the presence of another start code in the bit stream as indicated by decision step 141 in FIG. 1B. If there is no start code, the process simply returns to decoding macroblocks as indicated in FIG. 1C.

As shown in FIG. 1A, a slice start code is shown following the last macroblock. Thus, when the method again proceeds to step 141, firmware will determined that the next portion of the bit stream contains a start code, and the method will then proceed to a step 142 of FIG. 1B. At step 142, it is determined whether the next portion of the bit stream contains slice information. Since the next bit stream item is a slice start code 52, the method will proceed to step 120 where the slice header is decoded. Once the slice header is decoded as described above, the firmware steps then proceed to step 121 where the slice parameters identified in the decoded slice header are loaded onto predefined memory registers in the macroblock processing logic. From step 121, the method will again proceed according to the steps shown in FIG. 1C. Specifically, macroblock headers 56, 60 and macroblock data 58, 62 will be processed through the hardware macroblock processing logic and video core as described above.

Once the last two macroblocks identified in the bit stream have been processed, the process flow will return to firmware step 142 of FIG. 1B where it is determined whether the next bit stream item contains slice information. As shown in FIG. 1A, the next bit stream item is picture information 64, so the method proceeds to a firmware step 144 where it is determined whether the next bit stream is a picture. Since the next bit stream item contains picture information, the method will then proceed through firmware steps 116 to 121 (of FIG. 1B) where the bit stream information identified in 66, 68, 70, and 72 of FIG. 1A is processed. When the bit stream reaches a macroblock header 74, the method will then proceed to hardware (FIG. 1C) where macroblock headers 74, 78 and macroblock data 76, 80 are processed. As described above, FIG. 1C processes the macroblocks through the macroblock processing logic and the video core hardware until the next identified bit stream item is no longer a macroblock.

As shown in FIG. 1A, the next bit stream item is a sequence start code 81. Note that there is typically only a single sequence start code in a given video packet. However, to further illustrate the workings of this method, sequence start code 81 is shown as part of a single video packet.

After encountering start code 81, the method marches through firmware decisions steps 142, 144 and 146 where each will be answered in the negative. The method will then proceed to a step 148 where it is determined whether the next portion of the bit stream describes a new sequence. Since the next bit stream item is sequence start code 81, the method flow returns to step 110. As described above, the method will then proceed from step 110 through step 121 (of FIG. 1B) where the bit stream information identified in blocks 81 to 91 of FIG. 1A are processed by firmware. Next, the method will proceed to hardware (FIG. 1C) where a macroblock header 92 and a macroblock data 93 are processed in the macroblock processing logic and video core as described above.

The method then continues to process any received bit stream information performing the method steps of FIG. 1B in firmware, and the method steps of FIG. 1C on hardware until a new video start code (VSC) 94 is received as indicated at a step 150.

C. Partitioning Audio Decoding Tasks

Figure 2:
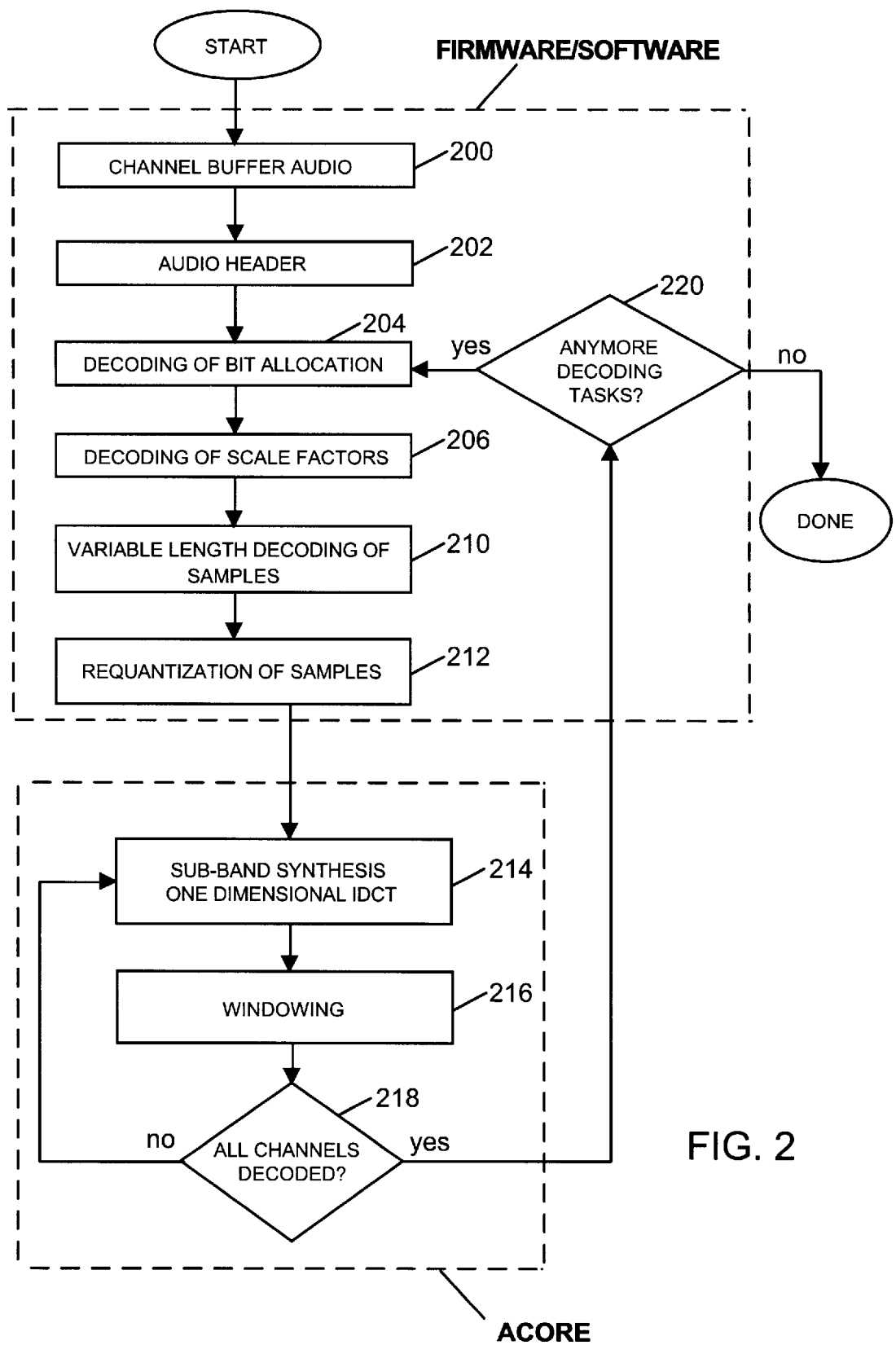
FIG. 2 is a process flow diagram illustrating the MPEG audio decoding steps performed in firmware in accordance with a preferred embodiment of this invention.

FIG. 2 shows the steps associated with decoding MPEG audio data in accordance with one embodiment of the present invention. For ease of illustration, the audio decoding steps performed in firmware have been distinguished from those performed in hardware by labeled dashed boxes. The decoding process starts at a step 200 where a bit stream identified as audio data is received by an audio channel buffer for temporary storage. The method then proceeds to a step 202 where an audio data header is decoded. As described above, headers contain various types of identifying information regarding the incoming bit stream. By way of example, the incoming bit stream may be identified as "MPEG" audio data. Once the audio header has been decoded in step 202, the method proceeds to a step 204 where a bit allocation decoding is performed. The decoded bit allocations provides information regarding the size (in number of bits) of scale factors and samples (both of which are subsequently decoded).

The method then proceeds to a step 206 where scale factors associated with the received audio data are decoded. As described in the MPEG/Audio documents, the decoder multiplies scale factors by matrix values used in a subsequent requantization step. Once the scale factors have been decoded in step 206, the method proceeds to a step 210 where a variable length decoding is performed on the video data samples decoded in step 206. The method then proceeds to a step 212 where the video data samples are requantized by matrix multiplication with matrices whose matrix elements have previously been multiplied by the decoded scale factors. Up to this point, the audio decoding process described in steps 200 through 212 is performed in firmware.

There are significant advantages to performing steps 200 through 212 in firmware. As described above, the MPEG decoding algorithm may be divided into portions that are rigidly defined by the standard, and portions that are less rigid and therefore more suitable for customization. Process steps 202 through 212 allow somewhat more flexibility in implementation than the steps which follow. Therefore, the MPEG audio decoding tasks described in steps 200 through 212 are preferably performed in firmware in order to allow designers to provide a decoding product that is easily adjusted to each customer's needs. Furthermore, these steps generally require relatively few CPU interrupts.

Note that while the audio requantization step 212 is implemented in firmware, the video requantization step 130 (FIG. 1C) is implemented in hardware. This is because the video requantization process is much more continuous and computationally intensive. It requires dequantizing two dimensional data for very many macroblocks per frame. In contrast, audio decoding requires dequantization of one dimensional data that is presented for dequantization much less frequently.

Once the firmware decoding tasks of steps 200 through 212 have been completed, subsequent MPEG decoding steps are implemented in hardware. Specifically, the decoding process resumes in hardware at a step 214 where a sub-band synthesis operation is performed. In MPEG audio, the sub-band synthesis is performed as a one-dimensional inverse discrete cosine transform (IDCT). This requires matrix multiplication of DCT coefficients (output from step 212) with IDCT constant multipliers preferably stored in an on-chip ROM. After step 214 is completed, the method proceeds to a step 216 where a windowing operation is performed on the audio data samples. Windowing involves several multiplication steps in which values output from the sub-band synthesis step 214 are multiplied by windowing coefficients (256 are required) stored on the ROM. The sub-band synthesis (e.g., matrixing) and windowing steps are described in the MPEG audio document in substantially greater detail. Further discussion of how these steps may be implemented in hardware (i.e., audio core microarchitecture), see related pending U.S. patent application Ser. No. 08/642,520 previously incorporated herein by reference.

As steps 214 and 216 involve numerous multiplication and addition steps, they are preferably implemented in hardware. Further, because they perform a portion of the decoding process that is rather rigidly defined by the MPEG standard, the hardware is preferably defined as fixed core.

Once the windowing step is performed in step 216, the method proceeds to a step 218 where it is determined whether all of the audio channels have been decoded. In MPEG, the encoded data may include up to five main channels (i.e., left, center, right, left surround, right surround) and one low frequency enhancement (LFE) channel for subwoofer signals. Therefore, if all channels have not been decoded, the method continues processing each of the audio channels through steps 214–216 (as shown) until all channels have been decoded.

Once it is determined that all channels have been decoded in step 218, the method proceeds to a step 220 where it is determined whether there are anymore MPEG audio decoding tasks. If there are more decoding tasks, the method again proceeds through the aforementioned steps.

Figure 3:
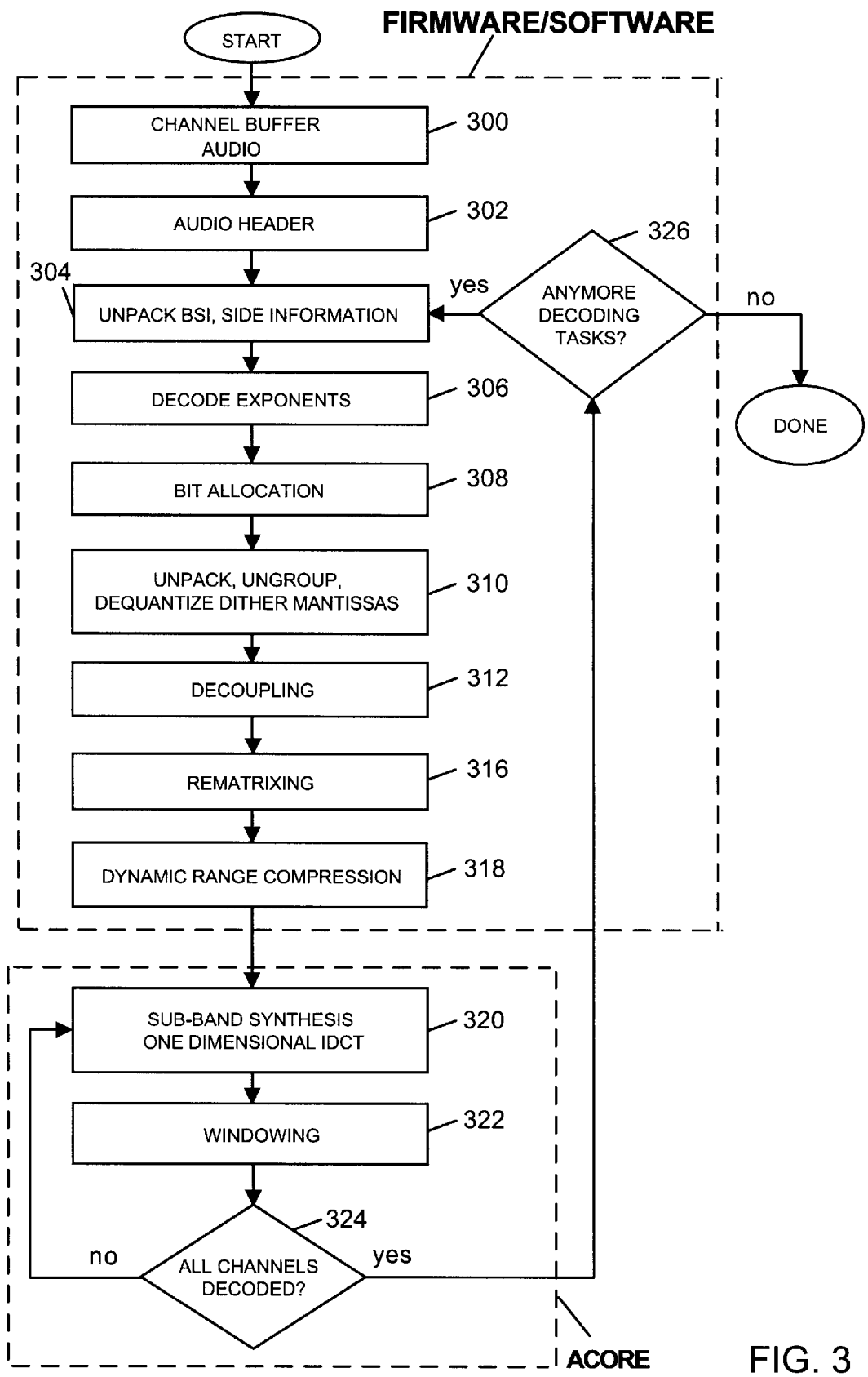
FIG. 3 is a process flow diagram illustrating the AC-3 audio decoding steps performed in firmware in accordance with a preferred embodiment of this invention.

FIG. 3 illustrates the steps associated with decoding AC-3 audio data in accordance with one embodiment of the present invention. The decoding process begins at a step 300 where a bit stream identified as audio data is received by an audio channel buffer for temporary storage. The method then proceeds to a step 302 where an audio data header is decoded. This header contains various types of identifying information regarding the incoming AC-3 bit stream.

Once the audio header has been decoded in step 302, the method proceeds to a step 304 where an unpack (i.e., de-multiplex) bit stream information (BSI) and side information is performed. As described in sections 5.1 and 6.2.3 of the AC-3 Document, the unpacked BSI parameters contain audio synchronization information. The side information parameters include information employed subsequent decoding process steps up to a windowing step. After step 304, the decoding process proceeds to a step 306 where AC-3 exponents are decoded. As described in the AC-3 Document, an AC-3 bit stream includes quantized frequency coefficients, and each coefficient is delivered in floating point form. Therefore, each coefficient has an exponent and a mantissa. Consequently, the received AC-3 exponents must be decoded as part of the audio decoding process.

The method then proceeds to a step 308 where a bit allocation process is performed. In general, the bit allocation process reveals the number bits that were used to encode each mantissa. The values used in the bit allocation computation include the bit allocation side information (provided in step 304). Generally, the values produced from the bit allocation computation are a set of bit allocation points, one bit allocation point for each coded mantissa.

Once the bit allocation step has been performed, the method proceeds to a step 310 where the process the decoding algorithm unpacks and ungroups the mantissas from the incoming bit stream and then dequantizes and dithers those mantissas. As described in the AC-3 Document, section 6.2.6, mantissa data is generally packed and grouped together to efficiently transmit the coded audio data. Consequently, the mantissa data must be unpacked by peeling off groups of bits as indicated by the bit allocation points and ungrouped such that the individual coded mantissa values are dequantized.

The method then proceeds to a step 312 where decoupling is performed on the decoded AC-3 samples. In general, decoupling involves reconstructing high frequency portions of each coupled channel, which include the common coupling channel and the coupling coordinates for each individual channel. To implement decoupling, the coupling channel coefficients within each coupling band are multiplied by the individual channel coupling coordinates.

After decoupling, the method proceeds to a step 316 where rematrixing is performed on the AC-3 samples. As described in the AC-3 Document, rematrixing is a process in which sums and differences of highly correlated channels are coded rather than coding the original channels themselves. Rematrixing is important for preserving Dolby Surround™ compatibility. It also serves to reduce the amount of processing required in at least one of the highly correlated channels. After rematrixing, the method proceeds to a step 318 where the process of dynamic range compression is performed as described in section 7.7 of the AC-3 Document.

As illustrated in FIG. 3, AC-3 decoding steps 300 through 318 have been performed in firmware. In general, steps 300 through 318 are performed less frequently than subsequent steps which are implemented in hardware. As a result, steps 300 through 318 can be implemented in firmware, thereby reducing the amount of chip area required for dedicated decoding hardware. Performing these decoding tasks in firmware will also allow designers to customize the decoder to meet their specific needs without having to perform costly hardware modifications. The first AC-3 decoding process step implemented in hardware (preferably in the audio core) is sub-band synthesis performed at a step 320. Sub-band synthesis in the context of AC-3 is a one-dimensional inverse fast fourier transform. After step 320 is completed, the method proceeds to a step 322 where a windowing operation is performed similarly to the windowing step required for MPEG. For more information on the AC-3 decoding steps performed in the audio core, reference may be made to a related pending U.S. patent application Ser. No. 07/642,520 previously incorporated by reference for all purposes. As the sub-band synthesis and windowing operations involve many multiplication and addition steps, they should be implemented in hardware.

The method then proceeds to step 324 where it is determined whether all channels for AC-3 samples have been decoded. If it is determined that all channels have not been decoded, the method again proceeds through steps 320 to 322. When it is determined in step 324 that all channels have been decoded, the method will proceed to a step 326 where it is determined whether there are any more decoding tasks. If there are more decoding tasks, the method will again proceed through steps 304 to 318 in firmware, and proceed through steps 320 through 322 in hardware. On the other hand, if it is determined in step 326 that there are no more AC-3 decoding tasks, the method will be done until the next AC-3 decoding task arrives.

D. Exemplary Partitioning

Figure 4:
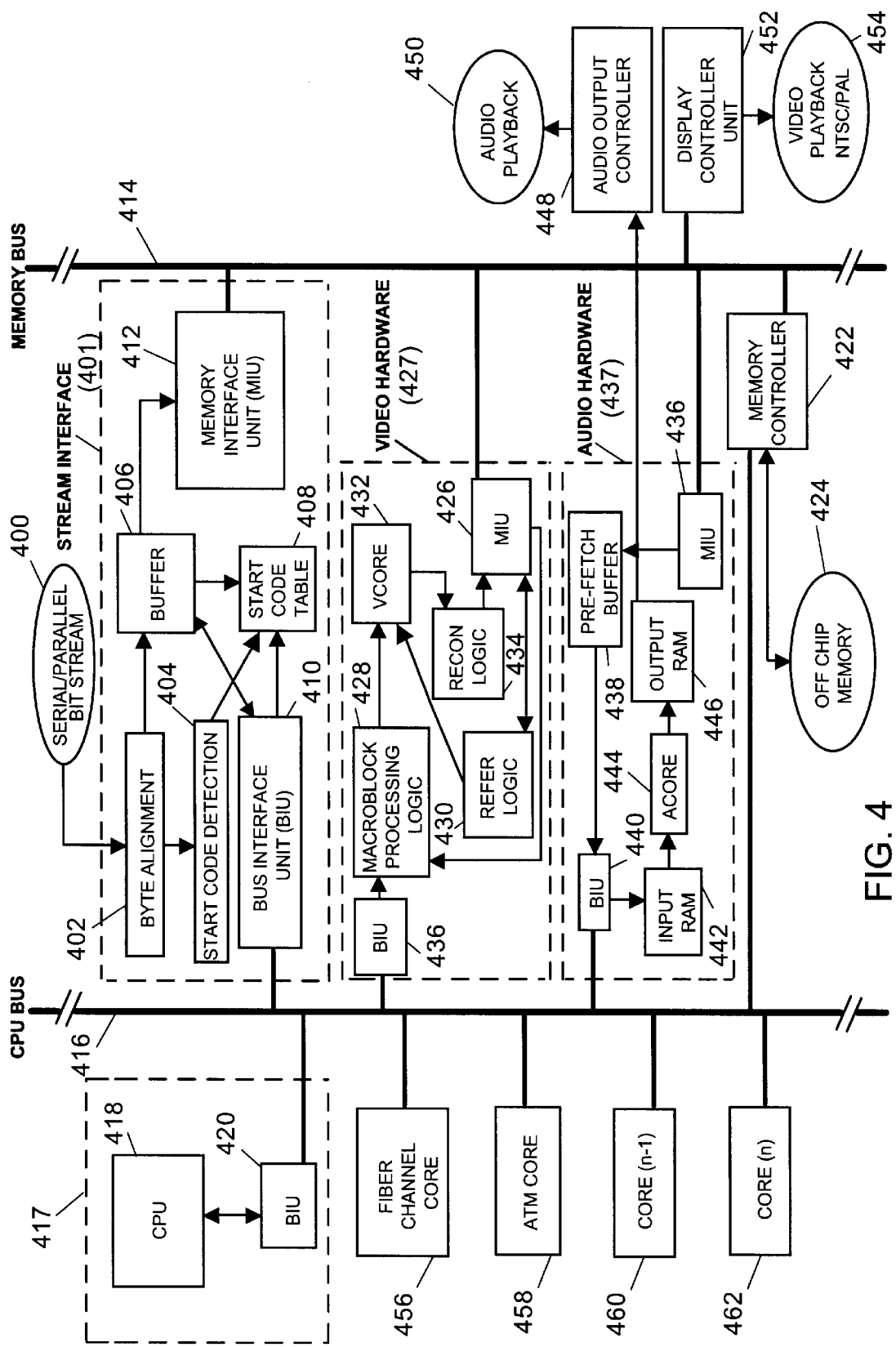
FIG. 4 is a block diagram illustrating the hardware blocks used to decoding video and audio data in accordance with a preferred embodiment of this invention.

FIG. 4 is a schematic diagram illustrating the hardware layout and signal interfaces of an audio and video decoder designed in accordance with one embodiment of this invention. A CPU 418 may communicate with the various hardware shells and modules by interconnecting to a CPU BUS 416 through a number of bus interface units (BIUs). Similarly, data may be transferred among the various hardware shells, modules and CPU by interconnecting to a MEMORY BUS 414 through a number of memory interface units (MIUs).

In the embodiment shown, four hardware shells are provided: a CPU shell 417, a stream interface shell 401, a video shell 427, and an audio shell 437. Each of these shells houses one or more hardware modules, such as hardware cores, dedicated to specific data processing tasks. In addition, the shells contain various interface units and other supporting logic for the main data processing modules. Generally, shells are hardware design layouts having the supporting logic and interfaces for cores or other major data processing modules. If such data processing module is substituted from design to another, the shell may still be used with minor modification. For more information on hardware shells and their relation to cores, reference may be made to a related pending U.S. patent application Ser. No. 08/642,393 previously incorporated by reference.

For ease of illustration, FIG. 4 will be described with reference to an incoming video bit stream and then with reference to an incoming audio bit stream. In a first example, the process begins when a stream interface shell 401 receives a video bit stream from an external source 400. The raw video data is then preparsed in order to convert the data into machine readable form. The video bit stream may be received serially or in parallel. If the bit stream is received serially, the bit stream will be processed in a hardware block 402 where a byte alignment operation is performed. The byte alignment operation is intended to align the serial bit stream into parallel byte (ie., 8 bits) size units. As described in the MPEG/Video Document, the bit stream received at block 402 may be a program stream having a video start code, or a bit stream having a packetized elementary stream (PES) header and a payload representing the video bit stream data (e.g., macroblock data) that must be decoded.

In this example, it will be assumed that a PES header and payload has been received by block 402. At this stage, the payload associated with the video bit stream is temporarily stored in a buffer block 406. The PES header is then stored in a start code table 408. In this embodiment, the stored PES header provides the "time stamp" information associated with synchronizing the playback of decoded video data. Once the start code table has the identifying time stamp information, a CPU 418 will periodically poll start code table 408 by communicating through a BIU 420 that is connected to CPU BUS 416, and is connected to a BIU 410 associated with the stream interface shell 401.

In this embodiment, buffer 406 temporarily holds the bit stream payload and start code detection block 404 holds the PES header (i.e, time stamp data). The byte alignment, start code detection, writing to start code, and buffer management functions performed within stream interface shell 401 eliminate the need for the CPU 418 to bit-level processing. By performing these functions in hardware, the need only determine what portion of the bit stream needs to be read for audio-video synchronization (by reading time stamps in the start code table 408). And the CPU can perform this function by polling without requiring an interrupt.

If CPU 418 determines that the time stamp information stored in start code table 408 requires the loading of the video payload stored in buffer 406 into a video hardware shell 427, the video payload will be transferred from buffer 406 into a memory interface unit (MIU) 412 that is connected to MEMORY BUS 414. The video payload is then transferred to an MIU 426 in the video hardware shell 427. From MIU 426, the video payload is transferred to a macroblock processing logic block 428 where various processing is performed as described in FIG. 1C (steps 122, 123, 124, 126, and 136—including macroblock header processing, motion vector decoding, variable length decoding, and run level decoding). Note that steering the buffered bitstream to appropriate memory locations is controlled by the CPU. This allows system designers to customize the memory partitions and other features associated with transferring data from buffer 406 to memory. Note also that the macroblock processing logic 428 may be implemented as either firmware or hardware. However, a hardware implementation is preferred because the process steps are sufficiently intensive that the CPU would have to be dedicated to performing only MPEG decoder functions. In some embodiments, the macroblock processing logic 428 may be implemented as a hardware core.

Preliminary to processing by macroblock processing logic 428, the bitstream data is subjected to certain preliminary video decoding steps (as described with reference to FIG. 1B) are processed by firmware, and are not performed in the video shell. At this stage, the data is in specified cache and registers. These firmware processes include decoding headers and extensions associated with MPEG video (a) sequences, (b) group of pictures, (c) pictures and (d) slices. As described above, these steps are preferably performed in firmware because they are not carried out very frequently and therefore require little of the CPU's processing resources. Further, if these functions were to be implemented in hardware, they would require a relatively large amount of chip area.

From macroblock processing logic 428, the macroblock data is directed into a video core 432 which performs at least some of the following functions: inverse scan, inverse quantization, inverse DCT, half-pel averaging, and a merge operation. For more information on the video core functions, reference may be made to a related pending U.S. patent application Ser. No. 08/642,396 filed on the same day as the instant application, and previously incorporated herein by reference.

If motion compensation video data is employed (i.e., the currently processed macroblock begins in a reference frame), a future or past picture (as opposed to the bitstream) must be retrieved from outside of video shell 427 and provided to MIU 426. In this case, refer logic block 430 will load reference picture information directly into the video core 432.

The processing steps performed by the video core are extremely computationally intensive (involving many addition and multiplication steps). Further, these steps are rather rigidly set by the MPEG/Video Document, and are therefore amenable to customization by designers. Thus, the functions performed by the video core are implemented as a hardware core.

Once the video core 432 has processed the current macroblock data, the decoded macroblock data is transferred to a recon logic block 434 which determines where to store each reconstructed macroblock and assigns an appropriate memory address in a channel buffer (not shown) located in an off-chip memory block 424. The macroblocks forwarded by recon logic unit 434 pass through MIU 426, and then through memory bus 414 and a memory controller 422 which directs the macroblock to the appropriate address in memory block 424.

In an alternative embodiment, it may be necessary to include a staging buffer (not shown) between MIU 426 and a memory bus 414 to temporarily store reconstructed macroblocks before they are transferred into memory bus 414 and into the memory controller 422, and to off-chip memory 424. The staging buffer addresses problems arising when memory bus 414 becomes too busy transferring data from the other hardware shells connected to memory bus 414. The staging buffer allows reconstructed data to be transferred to off-chip memory 424 through memory bus 414 when memory bus 414 is free of data traffic.

Video data processed in the video shell is transferred to a display control unit 452, and to a video playback block 454 at an appropriate playback time. Video play back block 454 also determines the appropriate playback rate for the reconstructed video data. If video display is not required until a later time, display control unit 452 will read the reconstructed video data from off-chip memory 424 when it is determined that display is appropriate. As described above, video data is constantly being reconstructed and placed into off-chip memory 424 channel buffer awaiting instructions for display (and possibly motion compensation), and once display is requested, display controller unit 452 calls on the reconstructed video data stored in the off-chip memory 424 and displays it through video display playback 454.

Display controller 452 also performs a number of standard tasks (such as video and on-screen display mix, 4:2:0 to 4:2:2 conversion for display, and color space conversion) which involve display timing and other real-time constraints. Therefore to avoid excessive interrupts of the CPU, these functions are implemented in hardware.

Assume now that the bit stream data entering the stream interface shell form external source 400 is audio data. As with the video bit stream, it is first determined whether the audio bit stream is being received serially or in parallel. If the audio bit stream is entering the stream interface shell in a serial manner, a byte alignment operation is performed on the bit stream in block 402. The PES header associated with the audio bit stream is then written into start code table 408 and the audio payload is temporarily stored in buffer 406. As described above, the entire bit stream need not be processed by CPU 418, but is merely stored in buffer 406 which frees up CPU bandwidth. CPU 418 may then poll start code table 408 by communicating through BIU 420, CPU bus 416, BIU 410, where it determines whether the audio PES header (i.e., time stamped information) requires the loading of the audio payload into an audio shell. If CPU 418 determines that the audio payload should be loaded into the audio shell, the payload will be transferred from buffer 406 to MIU 412, into memory bus 414, and from there into the audio shell.

On the other hand, if the CPU 418 determines from the PES header that processing of the audio payload stored in buffer 406 is not required at this time, the audio payload may be transferred from buffer 406 into MIU 412, into memory bus 414, into memory controller 422, and into off-chip memory 424 where it is stored in an audio partition. As a result, the audio data is therefore stored in an appropriate memory location off-chip until CPU 418 determines that resources are available for decoding in the audio shell. When CPU 418 determines that loading of audio data into the audio shell is required, CPU 418 will poll the off-chip memory 424 and locate the audio data stored in the audio partition of the channel buffer. This will cause the audio data stored in the channel buffer to be retrieved from off-chip memory 424. Note that the video data, like audio data, may also be temporarily stored in off-chip memory as necessary.

Regardless of whether the audio data is provided from buffer 406 or off-chip memory 424, it will enter the audio shell 437 under the direction of an MIU 436. The audio data is then transferred into a prefetch buffer 438 and then into a BIU 440. The audio data is then transferred to CPU BUS 416 and into BIU 420 for processing by CPU 418. Consequently, the data leaves the hardware shell to be processed as firmware by CPU 418. In the case of MPEG, this processing involves such steps as processing audio headers, bit allocation, selecting a scale factor index (MPEG Layer II only), decoding scale factors, extracting samples, requantizing samples using the corresponding scale factors, and setting up the audio samples and control registers to an audio core 444. These functions are performed at steps 200 through 212 (of FIG. 2). In the case of AC-3 decoding, the processing involves such steps as processing audio headers, unpacking BSI and side information, decoding exponents, bit allocation, unpacking, ungrouping, dequantizing and dithering mantissas, decoupling, rematrixing (if necessary), dynamic range compression, computing samples, and setting up the audio samples and control registers to an audio core 444. These functions are performed at steps 300 through 318 (of FIG. 3).

These functions are implemented in firmware because they are performed relatively infrequently and therefore do not require much CPU bandwidth. Further, if these functions were to be implemented in hardware, they would require a rather large chip area. Still further, as these functions differ among multiple audio standards and private protocols, some customization may be necessary based upon market requirements.

Returning again to FIG. 4, once the audio data has been processed by CPU 418, the processed audio data is transferred back to the audio shell through BIU 420, CPU BUS 416 and BIU 440. The resulting audio samples are then loaded into an input RAM 442. The audio samples are then transferred into the audio core 444 where sub-band synthesis and windowing are performed as described in FIGS. 2 and 3 (for MPEG and AC-3 respectively). Note that audio core 444 can matrix and window both MPEG and AC-3 samples. For more information on the functions performed in audio core 444, reference may be made to a related pending U.S. patent application Ser. No. 08/642,520 which was previously incorporated by reference. As matrixing and windowing are intensive mathematical functions and require a common data path and state machines, they are preferably implemented in hardware.

The windowed audio samples from audio core 444 are then transferred into an output RAM 446 before being transferred to an audio output controller 448. The reconstructed audio data is then transferred to an audio playback block 450. Because of the real time constraints associated with audio playback, audio output controller 448 is preferably implemented as hardware.

As illustrated, the above-described audio-video decoder may form part of a larger system chip performing multiple functions. These additional functions may be implemented by a number of other hardware cores sharing the resources of CPU 418. As shown, these additional cores are connected to CPU BUS 416. By way of example, a fiber channel core 456, an ATM core 458, a core (n−1) and a core (n) may be connected to CPU BUS 416. The added flexibility to incorporate additional hardware cores presents a designer with added customizing capabilities beyond those described above.

E. Conclusion

Although the foregoing invention has been described in some detail for purposes of clarity of understanding, it will be apparent that certain changes and modifications may be practiced within the scope of the appended claims. For example, while the video decoder core of this invention preferably implements specific functions in accordance the MPEG and AC-3 standard, there is in principal no reason why the video cores of this invention can not be employed with other video decoder algorithms which do not necessarily adhere to the MPEG or AC-3 protocols. Therefore, the present embodiments are to be considered as illustrative and not restrictive, and the invention is not to be limited to the details given herein, but may be modified within the scope of the appended claims.

What is claimed is:

1. An audio decoder for decoding audio data contained in a bitstream, the audio decoder comprising:
   a) firmware or software for implementing, in conjunction with a CPU, decoding fields containing parameters for processing said audio data; and
   b) hardware for implementing subband synthesis and windowing functions on said audio data;
   wherein the audio decoder decodes said audio data encoded according to an MPEG standard, and the firmware or software implements, in conjunction with the CPU, decoding of bit allocation, decoding of scale factors, and variable length decoding of samples.

2. The audio decoder of claim 1, wherein the firmware or software also implements one or more of the following functions: (1) loading audio samples contained in said audio data to a storage region before said audio samples are processed by said hardware, (2) providing control information from said bitstream to one or more control registers in said hardware, (3) requantizing said audio samples, (4) processing headers contained in the audio data, and (5) error checking.

3. The audio decoder of claim 1, wherein the hardware includes an audio core including a data path, a ROM, an input RAM interface, and an output RAM interface.

4. An audio decoder for decoding audio data contained in a bitstream, the audio decoder comprising:
   a) firmware or software for implementing, in conjunction with a CPU, decoding fields containing parameters for processing said audio data; and
   b) hardware for implementing subband synthesis and windowing functions on said audio data;
   wherein the audio decoder decodes said audio data encoded according to an AC-3 standard and the firmware or software implements, in conjunction with the CPU, bit allocation, decoding exponents, decoupling, rematrixing, and dynamic range compression.

5. An audio decoder for decoding audio data contained in a bitstream, the audio decoder comprising:
   a) software means for implementing, in conjunction with a processing means, decoding fields containing parameters for processing said audio data; and
   b) hardware means for implementing sub band synthesis and windowing functions on said audio data,
   wherein the software means also implements one or more of the following functions: (1) loading audio samples contained in said audio data to a storage means before said audio samples are processed by said hardware means, (2) providing control information from said bitstream to one or more control registers in said hardware means, (3) requantizing said audio samples, (4) processing headers contained in the audio data, and (5) error checking.

6. The audio decoder of claim 5, wherein the hardware means includes an audio core means including a data path, a ROM, an input RAM interface, and an output RAM interface.

7. The audio decoder of claim 5, wherein the audio decoder decodes said audio data encoded according to an MPEG standard.

8. The audio decoder of claim 7, wherein the software means implements, in conjunction with the processor means, decoding of bit allocation, decoding of scale factors, and variable length decoding of samples.

9. The audio decoder of claim 5, wherein the audio decoder decodes said audio data encoded according to an AC-3 standard.

10. The audio decoder of claim 9, wherein the software means implements, in conjunction with the processor means, bit allocation, decoding exponents, decoupling, rematrixing, and dynamic range compression.

11. A video decoder for decoding video data contained in a bitstream, the video decoder comprising:
    a) firmware or software for implementing, in conjunction with a CPU, video header processing functions, audio and video synchronization, and preparsing functions; and
    b) hardware for implementing preparsing assist, macroblock reconstruction, and video display control functions, and the preparsing assist functions implemented as hardware include one or more of byte alignment and start code detection, writing to a start code table, and a buffer management for the bitstream.

12. The video decoder of claim 11, wherein said audio and video synchronization functions include one or more of determining a starting point for decoding, video display control register programming, and audio playback control register programming.

13. The video decoder of claim 11, wherein the video header processing functions implemented by said firmware or software include programming hardware control registers with control information obtained from processing one or more video headers.

14. The video decoder of claim 13, wherein the video headers from which said information is obtained are MPEG video headers and include one or more of sequence headers, group of picture headers, picture headers, slice headers, sequence extensions, and picture extensions.

15. The video decoder of claim 11, wherein said hardware includes a video core for implementing at least some of the macroblock reconstruction functions, and wherein said video core performs at least the following operations: inverse scan, inverse quantization, IDCT, half pel averaging, and merge functions.

16. The video decoder of claim 11, wherein said hardware includes macroblock processing logic for implementing macroblock header processing, motion vector decoding, variable length decoding, and run length decoding.

17. A video decoder for decoding video data contained in a bitstream, the video decoder comprising:
    a) firmware or software for implementing, in conjunction with a CPU, video header processing functions, audio and video synchronization, and preparsing functions; and
    b) hardware for implementing preparsing assist, macroblock reconstruction, and video display control functions, and the preparsing assist functions implemented as hardware include one or more of byte alignment and start code detection, writing to a start code table, and a buffer management for the bitstream;
    wherein the preparsing functions include one or more of extraction of time stamp information from the bitstream, issuing commands to demultiplex the bitstream to at least a channel video memory and a channel audio memory, and programming direct memory access to transfer the bitstream from a stream buffer to at least the channel video memory or the channel audio memory.

18. A video decoder for decoding video data contained in a bitstream, the video decoder comprising:
    a) software means for implementing, in conjunction with a processor means, video header processing functions, audio and video synchronization, and preparsing functions, said audio and video synchronization functions include one or more of determining a starting point for decoding, video display control register programming, and audio playback control register programming; and b) hardware means for implementing preparsing assist, macroblock reconstruction, and video display control functions.

19. The video decoder of claim 18, wherein the preparsing functions include one or more of extraction of time stamp information from the bitstream, issuing commands to demultiplex the bitstream to at least a channel video memory means and a channel audio memory means, and programming direct memory access to transfer the bitstream from a stream buffer to at least the channel video memory or the channel audio memory.

20. The video decoder of claim 18, wherein the preparsing assist functions implemented as said hardware means include one or more of byte alignment and start code detection, writing to a start code table, and buffer management for the bitstream.

21. The video decoder of claim 18, wherein the video header processing functions implemented by said software means include programming hardware control registers means with control information obtained from processing one or more video headers.

22. The video decoder of claim 21, wherein the video headers from which said information is obtained are MPEG video headers and include one or more of sequence headers, group of picture headers, picture headers, slice headers, sequence extensions, and picture extensions.

23. The video decoder of claim 18, wherein said hardware includes a video core means for implementing at least some of the macroblock reconstruction functions, and wherein said video core means performs at least the following operations: inverse scan, inverse quantization, IDCT, half pel averaging, and merge functions.

24. The video decoder of claim 18, wherein said hardware means includes macroblock processing logic means for implementing macroblock header processing, motion vector decoding, variable length decoding, and run length decoding.

* * * * *